March 17, 1925.    1,529,912
J. V. L. PEACOCK
PULLING MACHINE
Filed May 26, 1920    2 Sheets-Sheet 1

INVENTOR.
J.V.L. Peacock
BY
ATTORNEY.

March 17, 1925.  
J. V. L. PEACOCK  
PULLING MACHINE  
Filed May 26, 1920  
1,529,912  
2 Sheets-Sheet 2
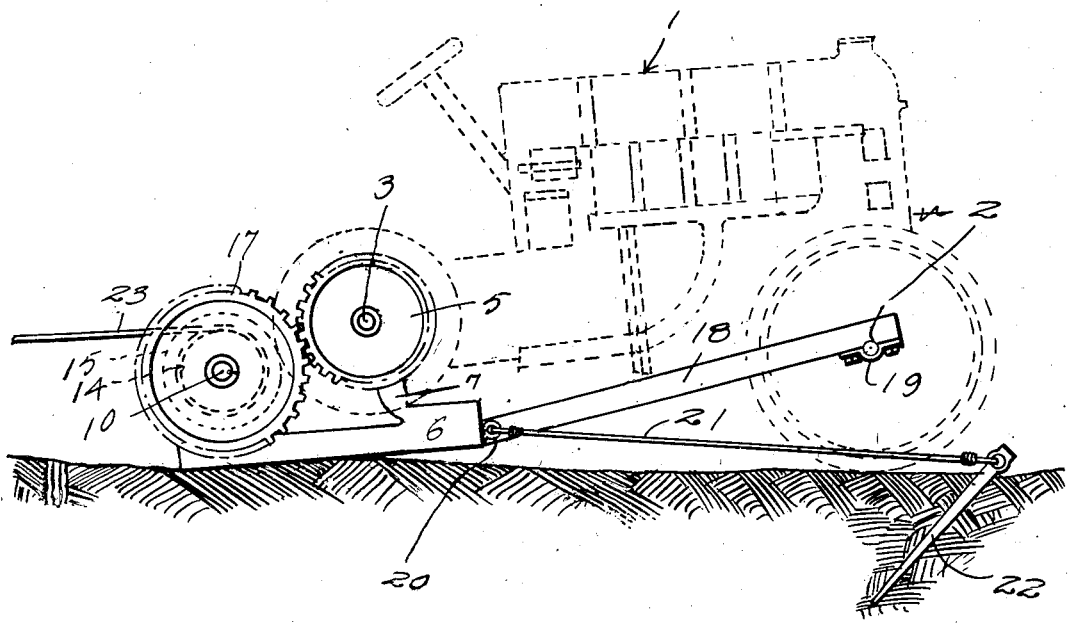
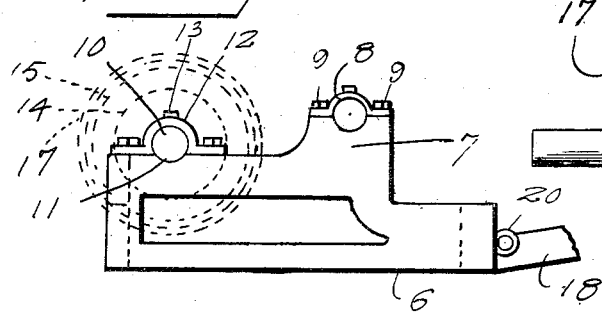   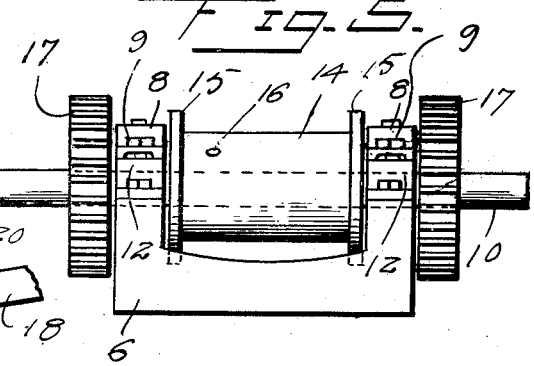
INVENTOR.  
J.V.L. Peacock  
BY  
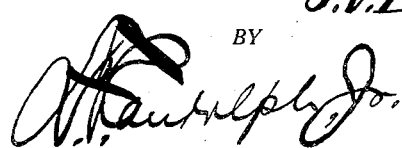  
ATTORNEY.

Patented Mar. 17, 1925.

1,529,912

UNITED STATES PATENT OFFICE.

JAMES V. L. PEACOCK, OF DOTHAN, ALABAMA, ASSIGNOR OF ONE-HALF TO WILLIAM B. JEFFRIES, OF DOTHAN, ALABAMA.

PULLING MACHINE.

Application filed May 26, 1920. Serial No. 384,366.

*To all whom it may concern:*

Be it known that I, JAMES V. L. PEACOCK, a citizen of the United States, residing at Dothan, in the county of Houston and State of Alabama, have invented certain new and useful Improvements in Pulling Machines; and I do hereby declare the following to be a full, clear, and exact description of the invention, such as will enable others skilled in the art to which it appertains to make and use the same.

This invention relates to a pulling machine and has for its primary object the provision of a pulling machine which will be of simple construction and highly efficient in use when employed for pulling stumps or moving heavy objects, raising hay or other heavy loads, and similar work.

The invention has for another object the association with the tractor frame of a skid adapted to support the rear end of the tractor frame and the pulling attachment when in driving connection therewith, the skid serving the important function of rigidly holding the tractor and the pulling mechanism in relative position, notwithstanding the lateral play requisite during the pulling operation.

The invention has for another object, the provision of means whereby a machine such as a tractor, an automobile or the like may be readily converted into a pulling machine at very slight cost and without materially altering the machine.

The invention has for another object, the provision of a pulling machine of the character stated in which the full energy of the motive power of the machine may be utilized while the machine is securely held against movement over the surface upon which it is positioned.

A still further object of the invention resides in the provision of a machine which may be readily attached to a tractor, or a motor vehicle or truck to convert the same into a pulling machine and the converted machine transported from place to place, thereby making it unnecessary to change the parts for each pulling operation in a different locality.

The invention has for a still further object the provision of an attachment of simple construction for a tractor or other motive power machine to convert the same into a pulling machine and utilize the power of the engine of the machine for the pulling operation while the driving wheels of the machine are withheld from engagement with the surface upon which the machine is positioned so as to prevent movement of the body of the machine.

With the foregoing and other objects in view as will be apparent as the description proceeds, the invention consists in the novel construction, combination and arrangement of cooperating elements as hereinafter more specifically set forth, claimed and shown in the accompanying drawings, in which—

Figure 3 is a view similar to Figure 1, showing the converted pulling machine in position for operation with the casting resting on the ground and the driving wheels of the machine removed.

Figure 4 is a side elevation of the converting attachment removed.

Figure 5 is an elevation of the parts shown in Figure 4 and taken at a right angle thereto, looking at the rear end of the attachment.

Figure 1:
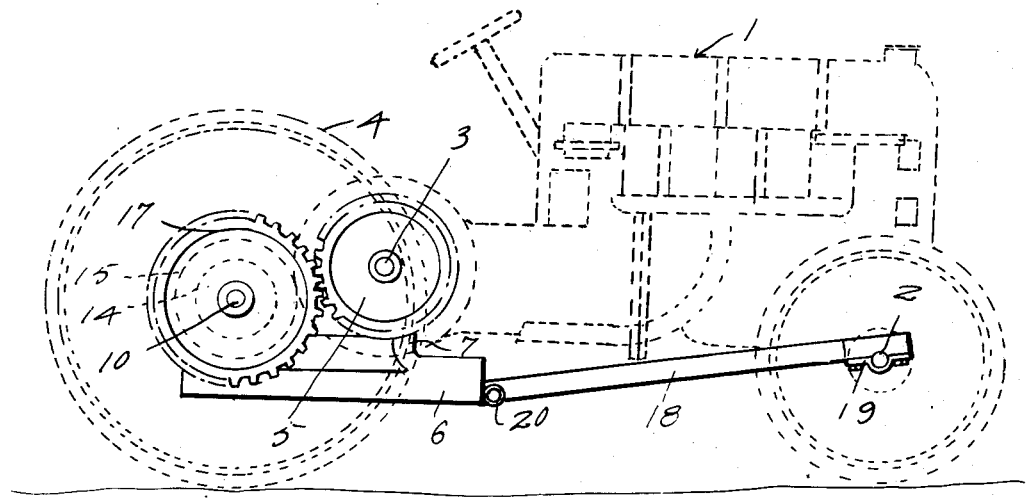
Figure 1 is a side elevation of the tractor converted into a pulling machine in accordance with the present invention.

Referring more in detail to the drawings in which similar reference characters designate corresponding parts throughout the several views, 1 designates in general a tractor, having a front axle 2 and a rear axle 3 of the usual differentially driven type upon which the rear wheels 4 are ordinarily mounted and which rear axle 3 may have a pair of comparatively large gear wheels 5 mounted thereon, adjacent the opposite ends of the shaft, when the wheels 4 are removed, the rear axle 3 being driven from the engine of the tractor in the usual manner and the rear ground wheels or drive wheels 4 being rigidly mounted on the rear axle 3 in any suitable and well known manner. The details of construction and arrangement of the parts of the tractor or other motor driven machine form no part of the present invention, however, but are simply illustrated and described so far as is necessary to show the application of the present invention thereto for the purpose of converting the machine into a pulling machine.

In order to convert the tractor or other motor driven machine into a pulling machine, I have provided a mounting body which may be in the form of a casting 6 forming a strong and rigid supporting skid of substantially rectangular form and having upstanding forward members 7 formed on its opposite sides for engagement with the under side of the rear axle 3 of the machine, upper bearing members 8 being adapted to be positioned over the axle 3 and secured upon the bearing members 7 to complete bearings for the axle 3, as shown at 9. The rear end of the casting 6 has a drum shaft 10 mounted transversely thereon in the bearing recesses 11 in the rear portion of the sides of the casting 6, as clearly shown in Figure 4 of the drawings. Suitable upper bearing members 12 are secured over the drum shaft 10 to complete the bearing therefor, as shown at 13. The shaft 10 carries the drum 14 on its central portion, within the casting 6 and this drum is provided with end flanges 15 to prevent a cable 23 from working off of the end of the drum 14 when being wound upon or unwound from said drum 14. This drum is also provided with a suitable opening 16 through which one end of the cable is secured, adjacent one end of the drum 14 and the drum is also preferably hollow to reduce the weight thereof without decreasing the strength and durability of the drum 14 and thereby interfering with the efficiency thereof.

It will be understood that the drum 14 is rigidly mounted upon the shaft 10 and this shaft has its opposite ends projecting for a suitable distance from the sides of the casting 6. Suitable gear wheels 17 are mounted on the extended portion of the shaft 10 and mesh with the gears 5 to be driven thereby when the attachment is applied to the machine 1.

Figure 2:
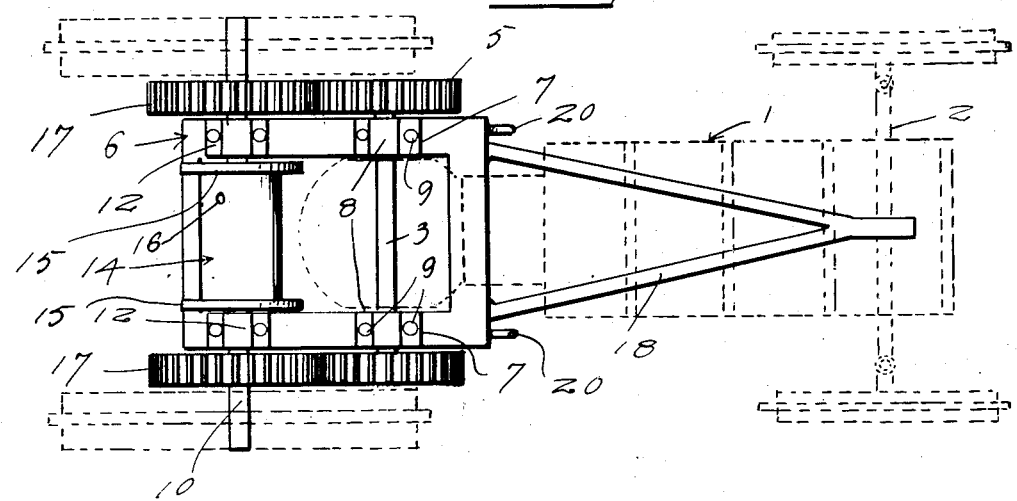
Figure 2 is a top plan view thereof.

As shown in Figure 3 of the drawing, the wheels 4 should be removed from the rear axle 3 and the gear wheels 5 substituted therefor when the attachment is applied to the tractor or other machine to convert the same into a pulling machine in accordance with this invention. With the rear ground wheels or drive wheels 4 removed, the rear portion of the machine will be permitted to drop downwardly until the casting 6 rests upon the ground or other surface over which the machine is positioned. The skid being in the manner described or in any equally effective manner rigidly connected to the rear and forward portions of the tractor frame, will at all times move with the latter as it shifts laterally during the pulling operation. For transporting the machine with the attachment applied thereto, the rear ground wheels or drive wheels 4 may be mounted on the extended ends of the shaft 10 of the attachment, as shown in Figures 1 and 2 of the drawings.

A tongue 18 is extended from the forward end of the casting 6 to the forward or front axle 2 of the machine 1 and to which forward axle it may be connected by a suitable connecting bracket 19 to assist in holding the casting 6 in proper position. A pair of eyes 20 are also secured in the forward or front end of the casting 6 so that anchoring cables 21 may be connected therewith and attached to anchoring posts 22 positioned forwardly of and to one side of the machine so as to serve as additional means for holding the machine 1 in position when serving as a pulling machine. It will be understood that the cables 21 may be connected with posts 22 driven into the surface for this special purpose or with any other stationary support.

From the foregoing description taken in connection with the accompanying drawings, it will be evident that the machine will be properly anchored in position for pulling stumps or for similar work and when employed for pulling stumps, the machine will function as the pulling cable 23 tightens upon the drum 14 after being changed to a new stump to extract the latter. It is believed that further detail description of the construction and operation of the machine with the improved attachment applied thereto is unnecessary. It is to be understood, however, that minor changes in the details of construction and arrangement of parts may be resorted to within the scope of what is claimed without departing from the spirit of the invention.

What is claimed is:—

1. Mechanism for converting into a stump puller, skidder or the like, a tractor having differentially driven rear axles and housing therefor, which comprises a heavy rigid base in the form of a skid having means to positively connect it in rigid relationship with both forward and rear ends of the tractor, a drum mounted on a shaft journaled on said skid parallel with the rear tractor axle housing, a positive driving connection between each end of said shaft and the differentially driven rear tractor axles, and an anchorage connection on the skid.

2. Mechanism for converting into a stump puller, skidder or the like, a tractor having differentially driven rear axles and housing therefor, which comprises a heavy rigid base in the form of a skid having at its forward end braces adapted to receive and clamp the rear axle housing of the tractor, a forward extending brace frame adapted to be connected to a forward element rigid with the tractor frame, a drum shaft journaled on the skid parallel with the rear tractor axle housing, a positive driving connection between each end of said shaft and the differentially driven rear tractor axles, and an anchorage connection on the skid.

3. Mechanism for converting a tractor into a stump puller, skidder or the like according to claim 1, in which the means to positively connect the skid in rigid relationship with the forward end of the tractor is adapted for attachment to the front tractor axle.

4. The combination with a tractor having front and rear axles and supporting wheels therefor, of a pulling attachment comprising gears adapted to be mounted in place of the wheels on the rear axles and to be driven thereby, a pedestal adapted to support the rear axles, a drum shaft journaled in said pedestal and carrying a drum and gearing driven by the gears on said rear axles, means to brace the pedestal to the tractor, and means to connect an anchorage to said pedestal.

5. A pulling attachment for motor driven tractors having external gears positively driven through its rear axle transmission, comprising a bearing frame on a skid having bearings therein for a drum shaft, a drum shaft journaled in said bearings, a drum mounted on the drum shaft, means to rigidly brace said skid to the rear end of the tractor, and means to drive said drum shaft from said external gears on the tractor.

6. A pulling attachment for motor driven tractors according to claim 5, in which said externally positively driven gears are adapted to replace the rear wheels of the tractors, said drum shaft has at each end gears directly driven by said external tractor gears, and means to attach an anchorage to the skid.

7. The combination with a motor tractor having front and rear axles and wheels mounted on said axles, of a pulling attachment comprising gears adapted to replace the rear tractor wheels, a pedestal adapted to support the rear end of the tractor, a drum shaft journaled in the rear end of said pedestal, a transmission to drive said drum shaft from said rear axle gears, journal bearings for said drum shaft having caps adapted to be moved to permit the drum shaft to be rolled rearwardly off the pedestal, means to brace the pedestal fore and aft to said tractor, and means to provide an anchorage for said pedestal.

In testimony whereof I affix my signature.

JAMES V. L. PEACOCK.

DISCLAIMER 1,529,912.—*James V. L. Peacock*, Dothan, Ala. PULLING MACHINE. Patent dated March 17, 1925. Disclaimer filed June 15, 1931, by the patentee, and the *Medley Manufacturing Company*.

Hereby enter this disclaimer to that part of the claim in said specification which is in the following words, to-wit:

"4. The combination with a tractor having front and rear axles and supporting wheels therefor, of a pulling attachment comprising gears adapted to be mounted in place of the wheels on the rear axles and to be driven thereby, a pedestal adapted to support the rear axles, a drum shaft journaled in said pedestal and carrying a drum and gearing driven by the gears on said rear axles, means to brace the pedestal to the tractor, and means to connect an anchorage to said pedestal."

"7. The combination with a motor tractor having front and rear axles and wheels mounted on said axles, of a pulling attachment comprising gears adapted to replace the rear tractor wheels, a pedestal adapted to support the rear end of the tractor, a drum shaft journaled in the rear end of said pedestal, a transmission to drive said drum shaft from said rear axle gears, journal bearings for said drum shaft having caps adapted to be moved to permit the drum shaft to be rolled rearwardly off the pedestal, means to brace the pedestal fore and aft to said tractor, and means to provide an anchorage for said pedestal."

[*Official Gazette June 30, 1931.*]